US 11,603,866 B2

(12) United States Patent
Schaupp et al.

(10) Patent No.: US 11,603,866 B2
(45) Date of Patent: Mar. 14, 2023

(54) LANDFILL WELL PUMP

(71) Applicant: Q.E.D. Environmental Systems, Inc., Dexter, MI (US)

(72) Inventors: John F. Schaupp, Sylvania, OH (US); Steven R. Wells, Howell, MI (US)

(73) Assignee: Q.E.D. Environmental Systems, Inc., Dexter, MI (US)

(*) Notice: Subject to any disclaimer, the term of this patent is extended or adjusted under 35 U.S.C. 154(b) by 352 days.

(21) Appl. No.: 17/076,310

(22) Filed: Oct. 21, 2020

(65) Prior Publication Data
US 2021/0115768 A1    Apr. 22, 2021

Related U.S. Application Data

(60) Provisional application No. 62/923,979, filed on Oct. 21, 2019.

(51) Int. Cl.
| F04F 1/08 | (2006.01) |
| F04F 1/20 | (2006.01) |
| E21B 43/12 | (2006.01) |
| F04B 49/025 | (2006.01) |
| F16K 33/00 | (2006.01) |

(52) U.S. Cl.
CPC .............. F04F 1/08 (2013.01); F04B 49/025 (2013.01); F04F 1/20 (2013.01); F16K 33/00 (2013.01); E21B 43/121 (2013.01)

(58) Field of Classification Search
CPC ... F04F 1/08; F04F 1/20; F04B 49/025; E21B 43/121; F16K 33/00
See application file for complete search history.

(56) References Cited

U.S. PATENT DOCUMENTS

| 4,092,087 A * | 5/1978 | Anthony ................... F04F 1/08 417/147 |
| 5,141,404 A * | 8/1992 | Newcomer ............... F04F 1/08 417/133 |
| 5,641,272 A * | 6/1997 | Harrold ..................... F04F 1/08 417/133 |
| 6,039,546 A * | 3/2000 | Edwards ................... F04F 1/08 166/105 |
| 6,045,336 A * | 4/2000 | Webb ................. B01D 17/0214 210/170.07 |
| 10,030,651 B1 * | 7/2018 | Cassel ...................... F04F 1/06 |

* cited by examiner

Primary Examiner — Charles G Freay
(74) Attorney, Agent, or Firm — Kinney & Lange, P.A.

(57) ABSTRACT

A submersible fluid pump suitable for use in a landfill well includes an outer case extending along a vertical axis and at least partially defining an interior of the fluid pump, a fluid inlet and outlet, a discharge tube within the outer case and disposed between the fluid inlet and the fluid outlet, a float positioned around the discharge tube and within the outer case such that the float is within the discharge tube and the outer case, the float being movable along the discharge tube in an axial direction, a pneumatic valve configured to introduce pressurized air into the interior of the fluid pump, an actuator configured to open and close the pneumatic valve, and a plurality of magnets comprising a first magnet fixed with respect to the actuator and a second magnet fixed with respect to the float, the second magnet configured to magnetically repel the first magnet as the float moves to tip the actuator to either open or close the pneumatic valve.

20 Claims, 12 Drawing Sheets

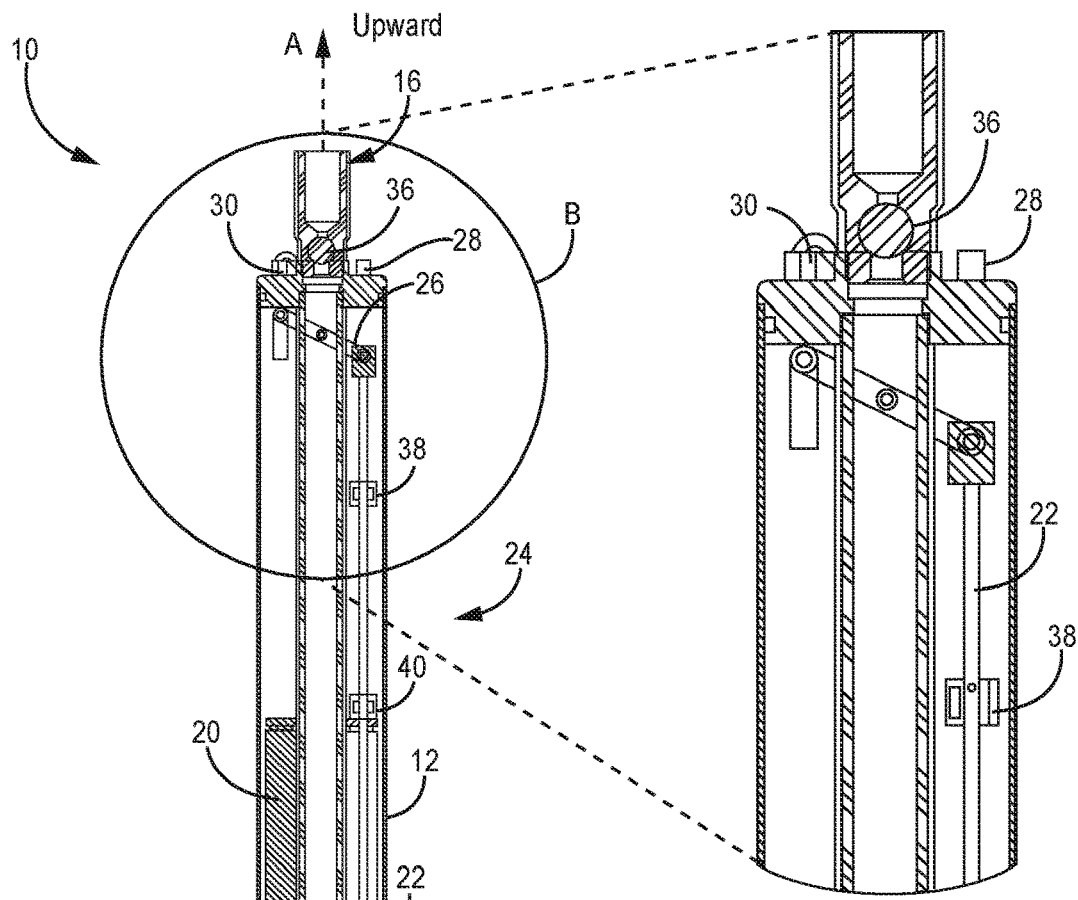
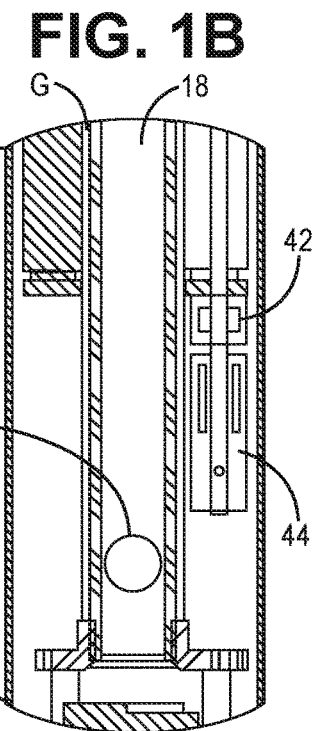
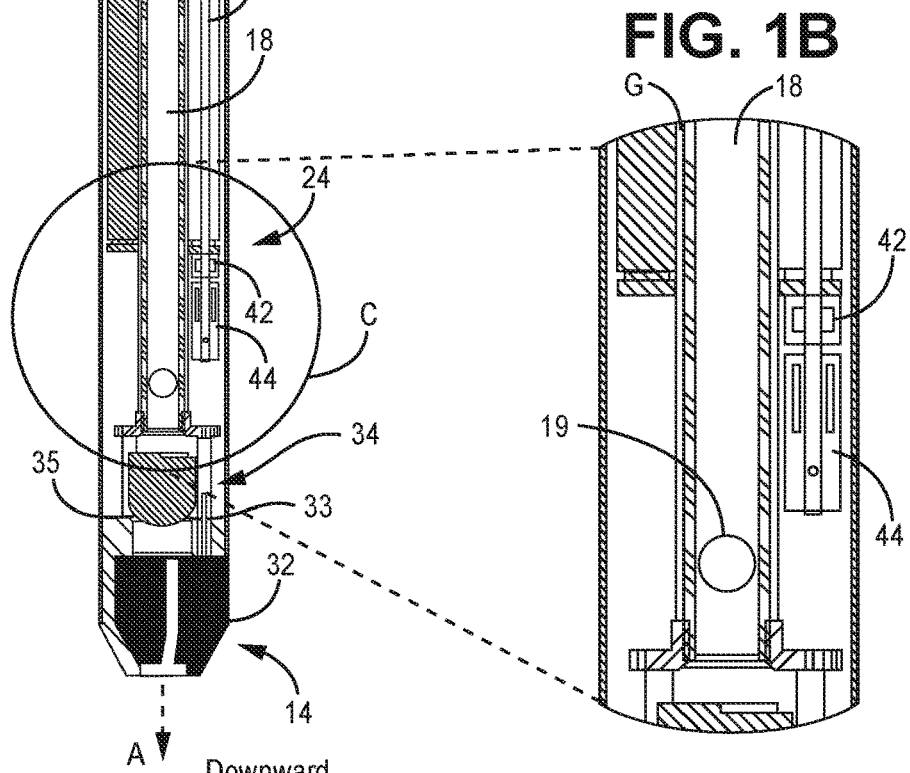
FIG. 1A
FIG. 1B
FIG. 1C

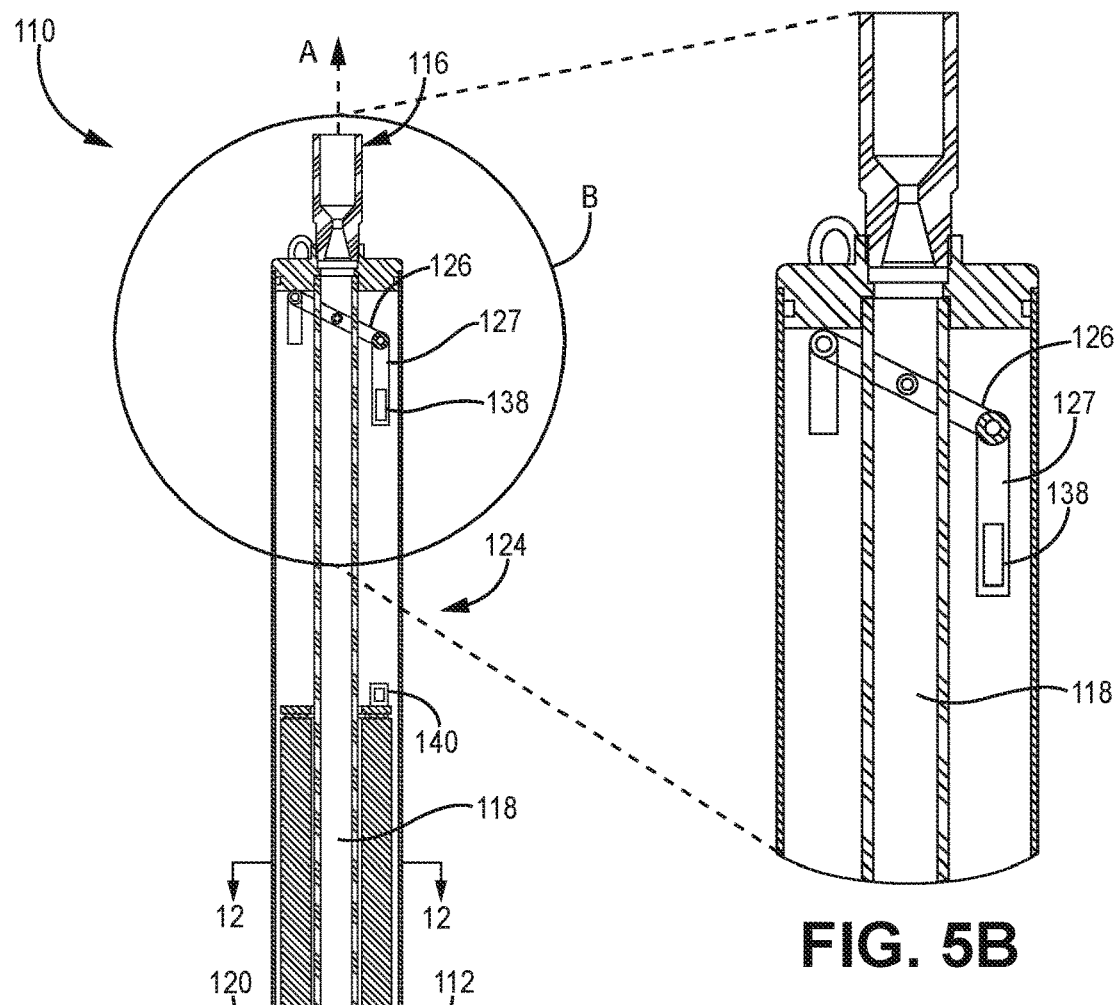
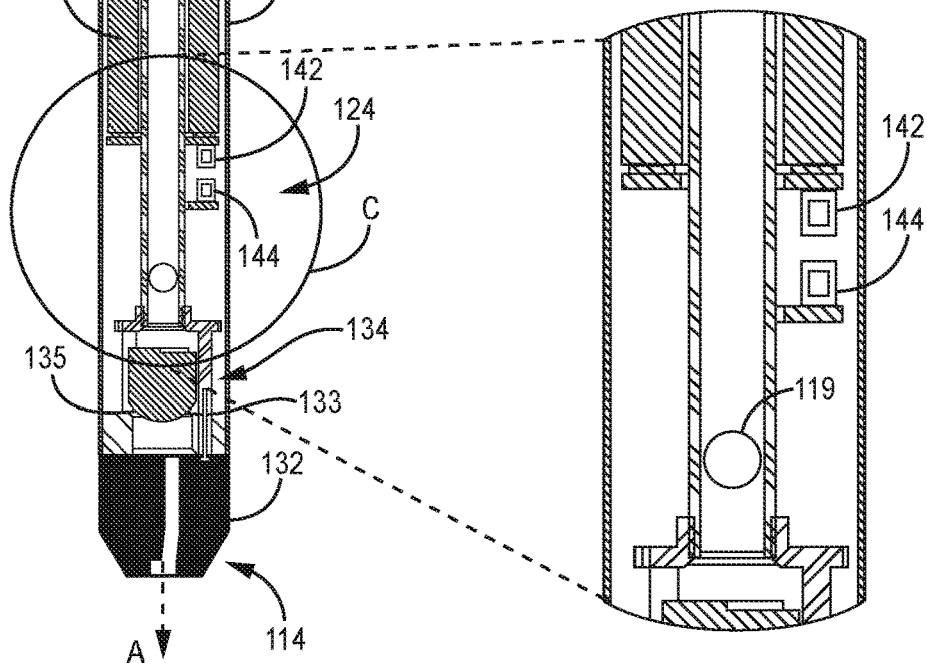
FIG. 5A
FIG. 5B
FIG. 5C

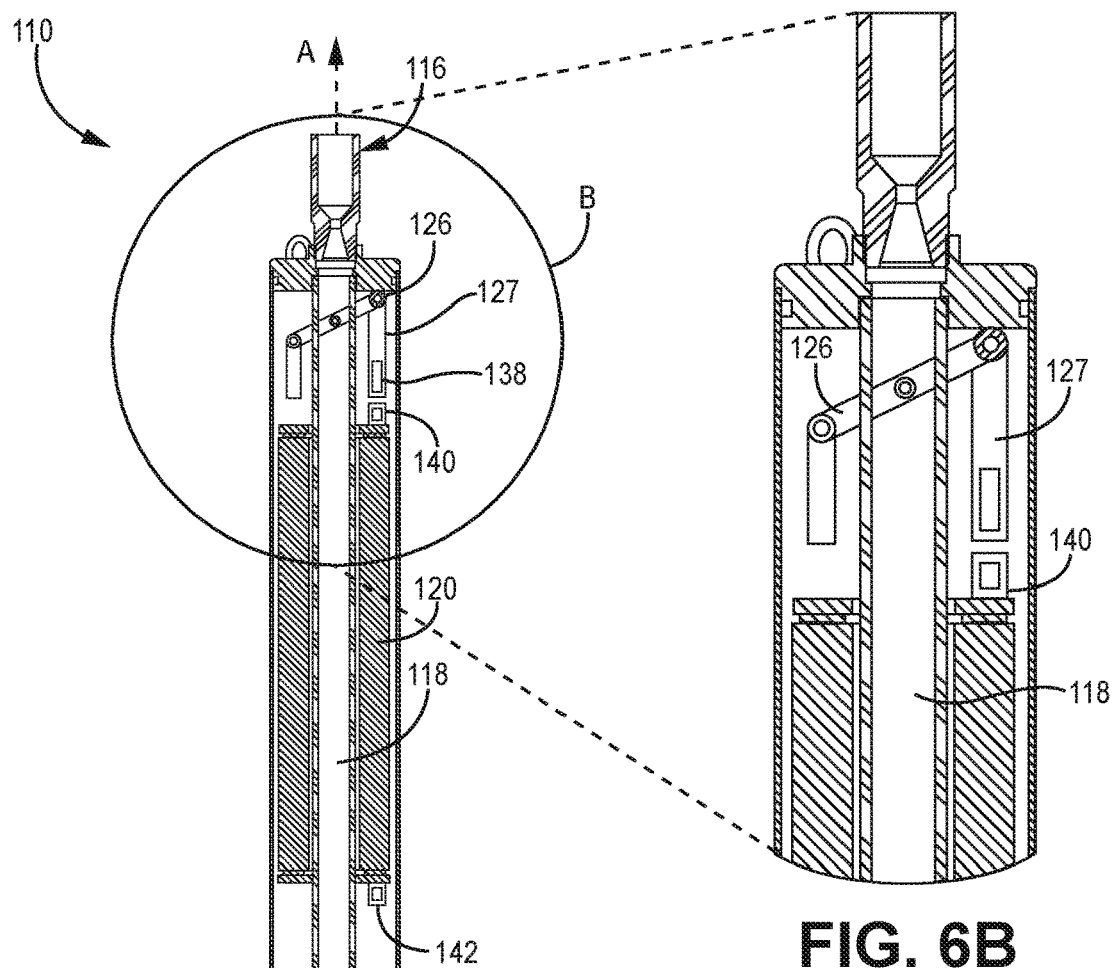
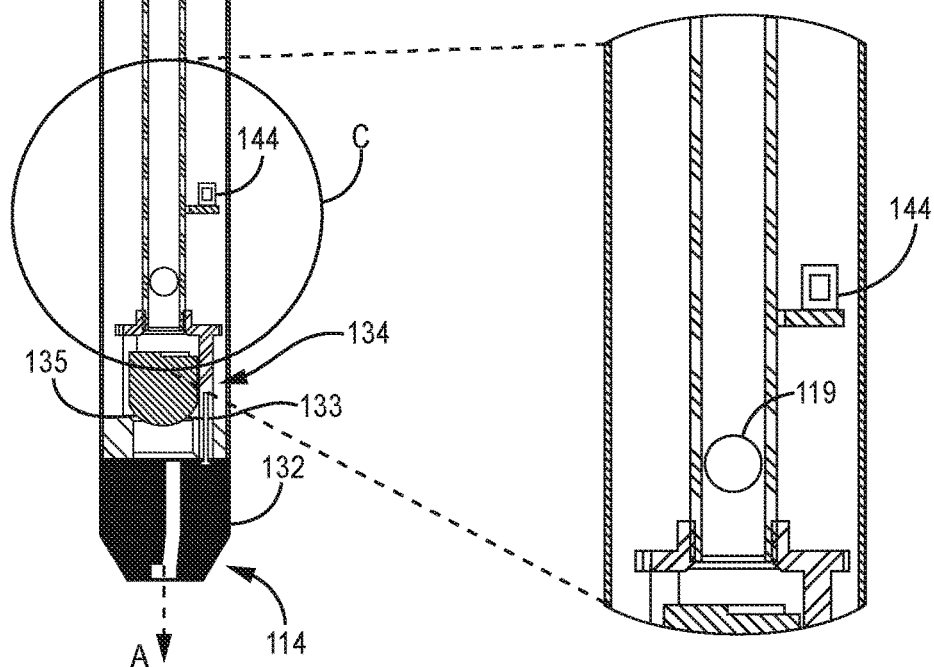
FIG. 6A
FIG. 6B
FIG. 6C

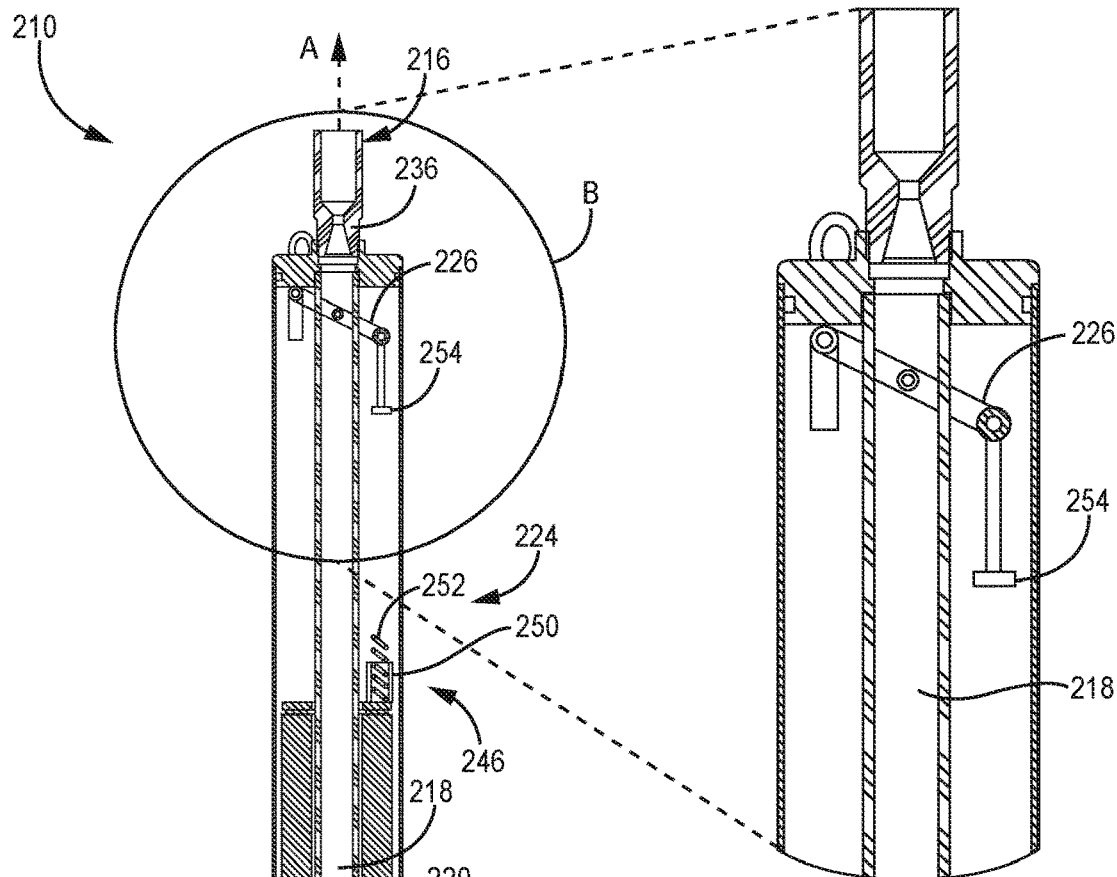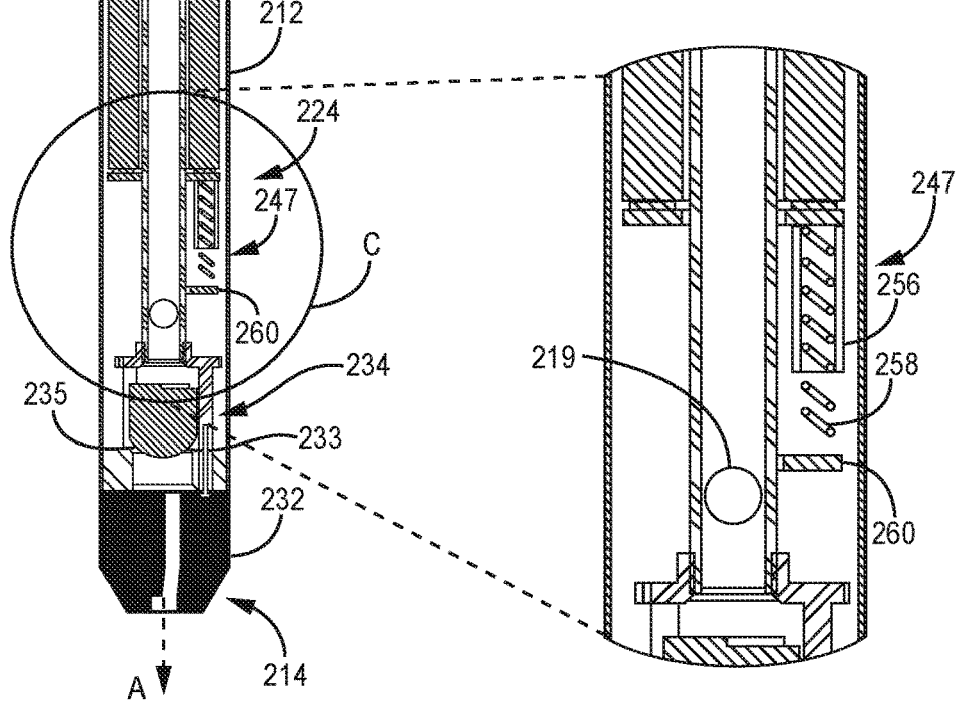
FIG. 7A
FIG. 7B
FIG. 7C

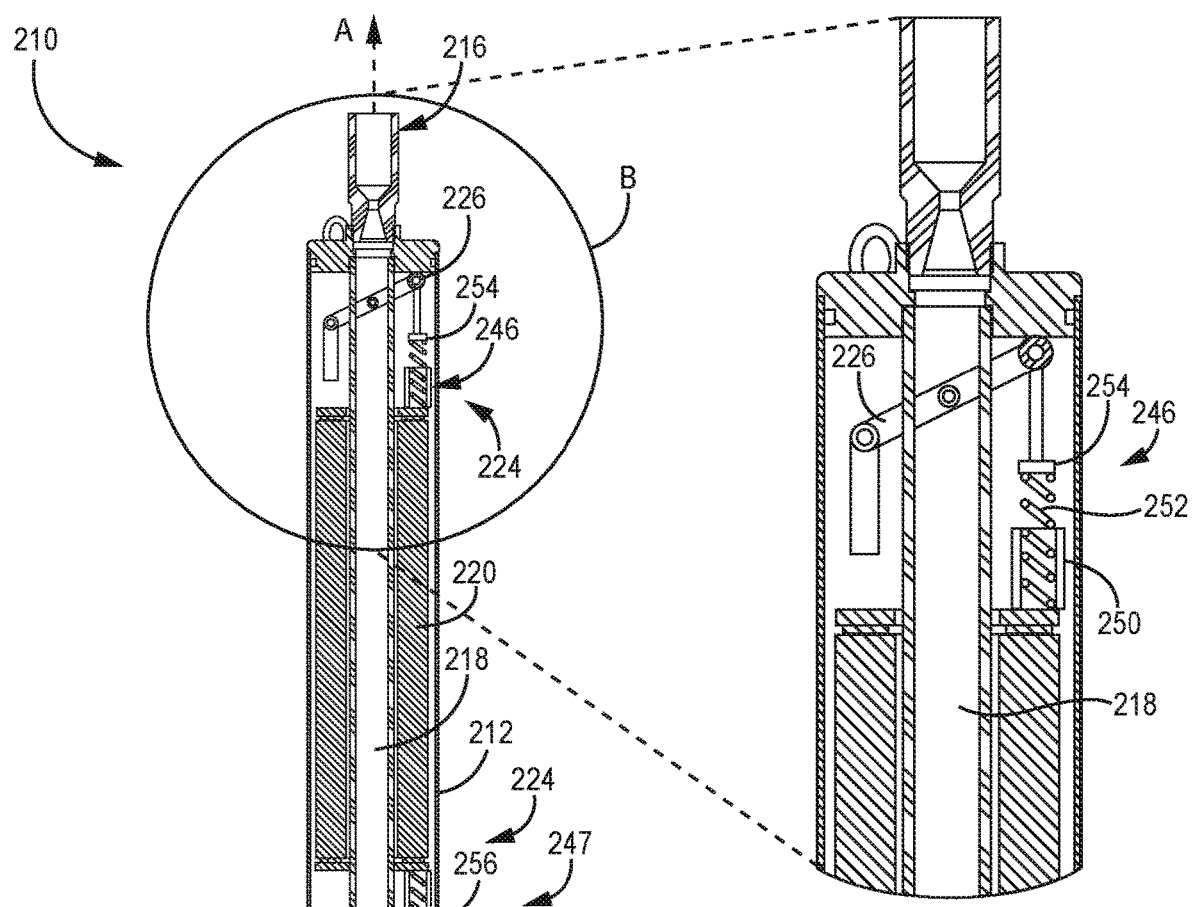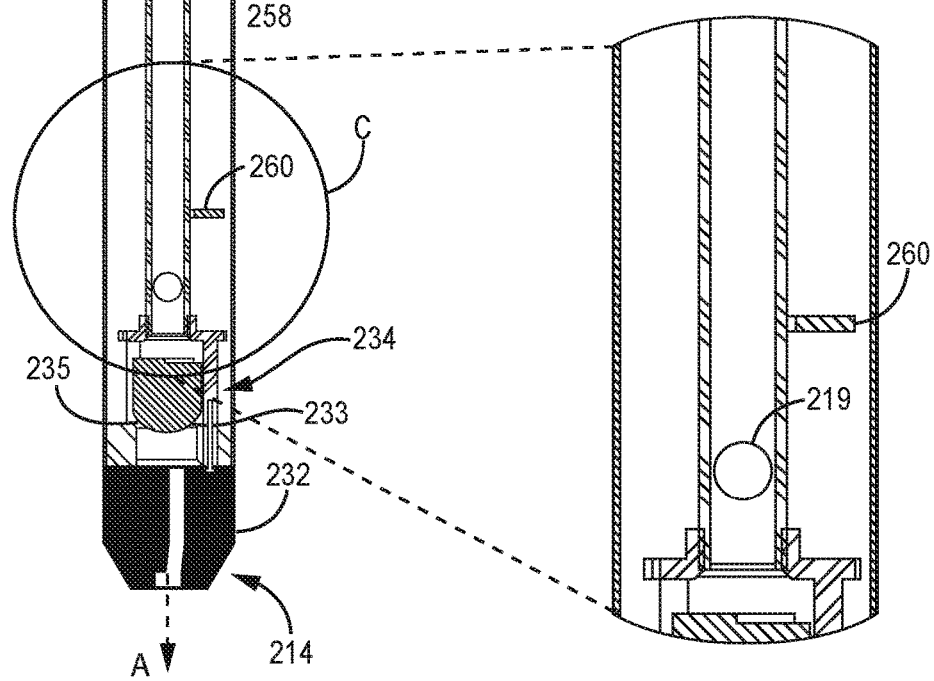
FIG. 8A
FIG. 8B
FIG. 8C

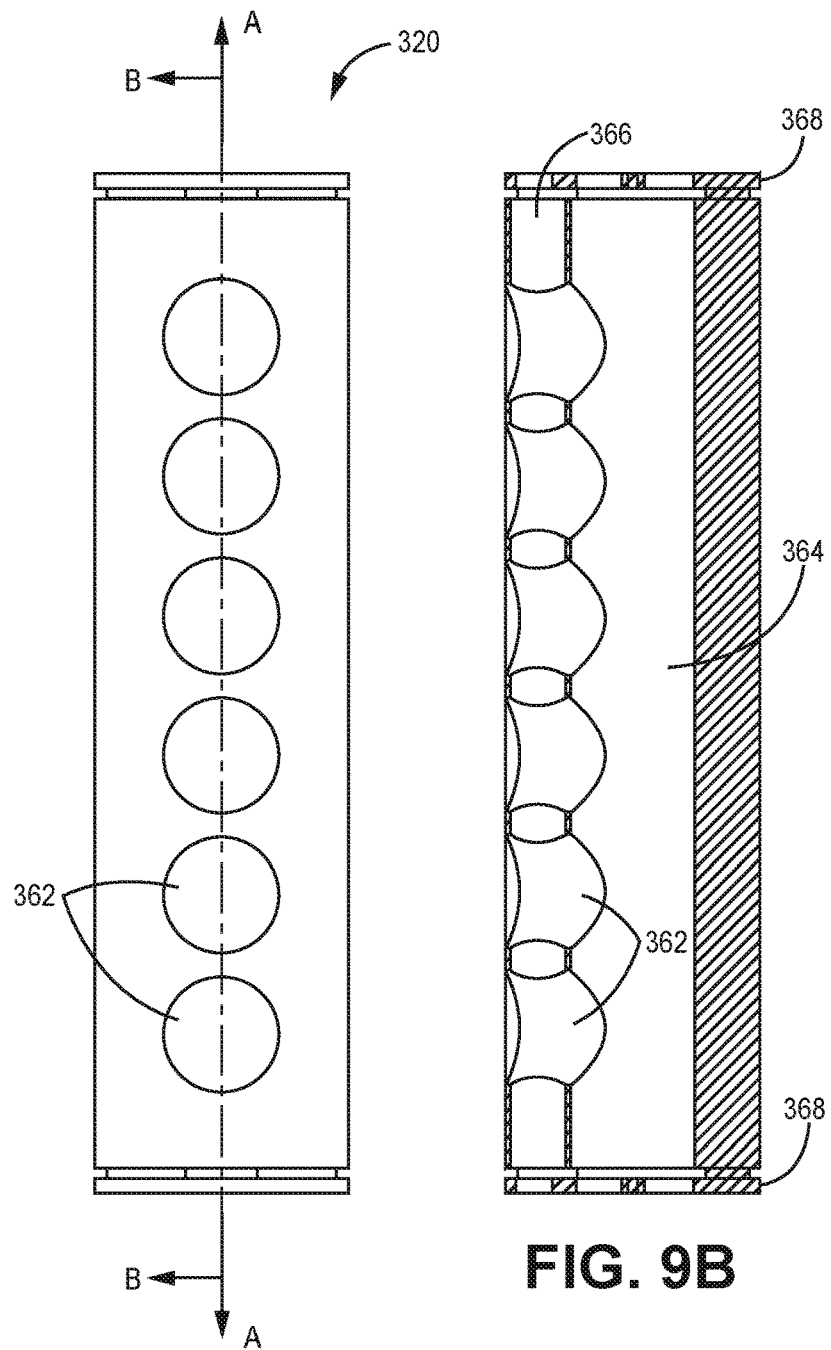
FIG. 9A
FIG. 9B
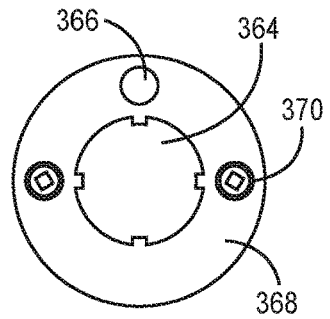
FIG. 9C

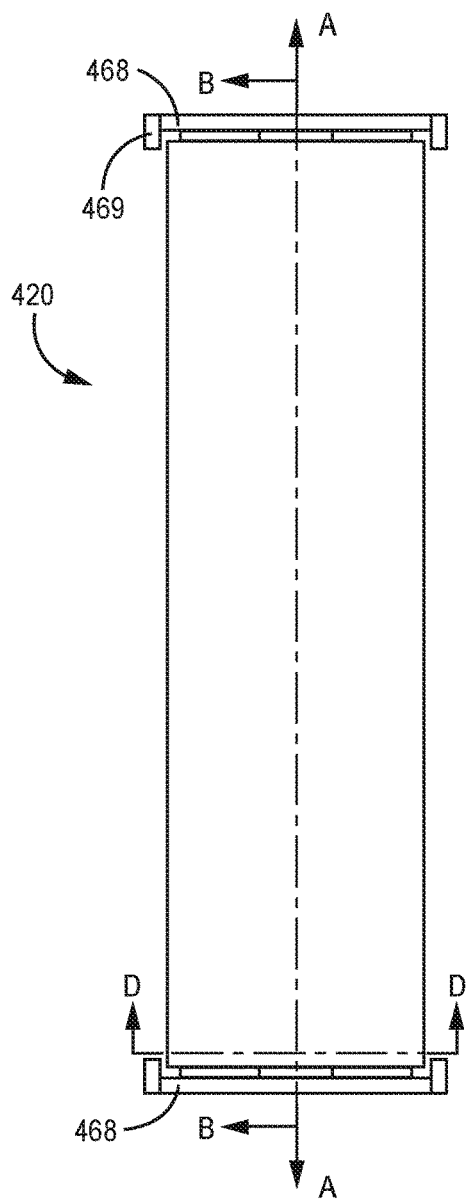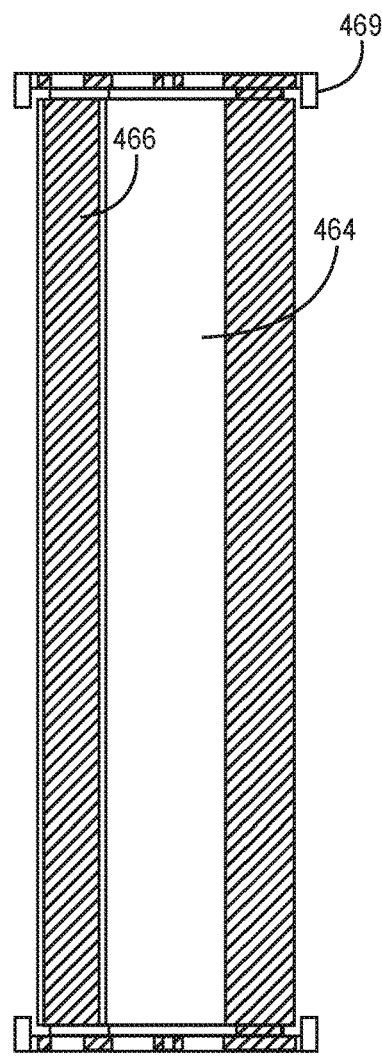
FIG. 10A  FIG. 10B
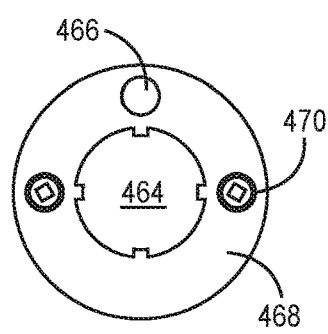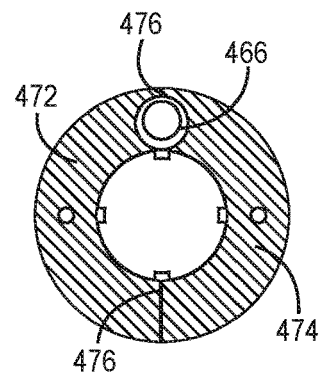
FIG. 10C  FIG. 10D

LANDFILL WELL PUMP

CROSS-REFERENCE TO RELATED APPLICATION(S)

This application claims the benefit of U.S. Provisional Application No. 62/923,979, filed Oct. 21, 2019 for "LANDFILL WELL PUMP" by J. F. Schaupp and S. Wells.

BACKGROUND

The present invention relates generally to well pumps, and more specifically, to submersible well pumps for removing accumulated liquids from a landfill.

Landfills can accumulate liquids due to rain, the breakdown of landfill contents, and other possible causes. The liquids can include leachate chemicals which are preferably removed from the landfill or at least monitored. As such, landfill wells are equipped with pumps to remove the liquids. In some cases, the pumps are used to lower the water table within the landfill, while in other cases, the pumps are used to remove liquid for sampling. Operating in the landfill environment requires the pumps to transport liquids with slurry and various highly corrosive chemicals at high temperatures generated by chemical decomposition of landfill contents. Pumps should be capable of operating in this environment while also having high reliability at reasonable costs and energy consumption. Accordingly, various aspect of well pump design are referenced herein.

SUMMARY

A submersible fluid pump suitable for use in a landfill well includes an outer case extending along a vertical axis and at least partially defining an interior of the fluid pump, a fluid inlet and outlet, a discharge tube within the outer case and disposed between the fluid inlet and the fluid outlet, a float positioned around the discharge tube and within the outer case such that the float is within the discharge tube and the outer case, the float being movable along the discharge tube in an axial direction, a pneumatic valve configured to introduce pressurized air into the interior of the fluid pump, an actuator configured to open and close the pneumatic valve, and a plurality of magnets comprising a first magnet fixed with respect to the actuator and a second magnet fixed with respect to the float, the second magnet configured to magnetically repel the first magnet as the float moves to tip the actuator to either open or close the pneumatic valve.

A submersible fluid pump suitable for use in a landfill well includes an outer case extending along a vertical axis and at least partially defining an interior of the fluid pump, a fluid inlet and outlet, a discharge tube within the outer case and disposed between the fluid inlet and the fluid outlet, a float positioned around the discharge tube and within the outer case such that the float is within the discharge tube and the outer case, the float being movable along the discharge tube in an axial direction, a pneumatic valve configured to introduce pressurized air into the interior of the fluid pump, an actuator configured to open and close the pneumatic valve, wherein the fluid pump does not include a control rod.

A method regulates axial movement of a float within a fluid pump having an outer case extending along a vertical axis and a discharge tube coaxial with the outer case and disposed between a fluid inlet and a fluid outlet of the pump. The method includes shifting the float in a first axial direction toward a rocker mounted on the discharge tube, dampening a movement of the float in the first axial direction by a dampening mechanism a least partially disposed on the float, actuating the rocker from a first state to a second state by movement of the float in the first axial direction, wherein the rocker opens a pneumatic valve when in the second state such that pressurized gas can enter the outer case to drive fluid out of the pump through the discharge tube, and shifting the float in a second axial direction away from the rocker as a fluid level within the pump decreases.

A submersible fluid pump suitable for use in a landfill well includes an outer case extending along a vertical axis and at least partially defining an interior of the fluid pump, a fluid inlet and outlet, a discharge tube within the outer case and disposed between the fluid inlet and the fluid outlet, and a float positioned around the discharge tube and within the outer case such that the float is within the discharge tube and the outer case, the float being movable along the discharge tube in an axial direction. The float includes a main passageway extending in the axial direction and configured to accommodate the discharge tube, at least two holes extending radially from an exterior of the float to the main passageway, and at least one endcap attached to an upper end or lower end of the float. The float has a tubular geometry and is formed from a foam material.

A submersible fluid pump suitable for use in a landfill well includes an outer case extending along a vertical axis and at least partially defining an interior of the fluid pump, a fluid inlet and outlet, a discharge tube within the outer case and disposed between the fluid inlet and the fluid outlet, and a float positioned around the discharge tube and within the outer case such that the float is within the discharge tube and the outer case, the float being movable along the discharge tube in an axial direction. The float includes a main passageway extending in the axial direction and configured to accommodate the discharge tube, at least two holes extending radially from an exterior of the float to the main passageway, and at least one endcap attached to an upper end or lower end of the float. The float has a tubular geometry and is formed from a foam material, and is further configured as two arcuate sections with axial seams formed at an interface of the two arcuate sections.

BRIEF DESCRIPTION OF THE DRAWINGS

FIG. 1A is a cross-sectional view of an embodiment of a land fill well pump in a first state.

FIG. 1B is an enlarged view of detail B in FIG. 1A.

FIG. 1C is an enlarged view of detail C in FIG. 1A.

FIG. 5A is a cross-sectional view of an alternative embodiment of the landfill well pump in the first state.

FIG. 5B is an enlarged view of detail B in FIG. 5A.

FIG. 5C is an enlarged view of detail C in FIG. 5C.

FIG. 6A is a cross-sectional view of the alternative embodiment of the landfill well pump in the second state.

FIG. 6B is an enlarged view of detail B in FIG. 6A.

FIG. 6C is an enlarged view of detail C in FIG. 6A.

FIG. 7A is a cross-sectional view of a second alternative embodiment of the landfill well pump in the first state.

FIG. 7B is an enlarged view of detail B in FIG. 7A.

FIG. 7C is an enlarged view of detail C in FIG. 7A.

FIG. 8A is a cross-sectional view of the second alternative embodiment of the landfill well pump in the second state.

FIG. 8B is an enlarged view of detail B in FIG. 8A.

FIG. 8C is an enlarged view of detail C in FIG. 8A.

FIG. 9A is an elevation view of an embodiment of a landfill will pump float.

FIG. 9B is a cross-sectional view of the float taken along line B-B of FIG. 9A.

FIG. 9C is a top plan view of the float of FIG. 9A.

FIG. 10A is an elevation view of an alternative embodiment of a landfill will pump float.

FIG. 10B is a cross-sectional view of the float taken along line B-B of FIG. 10A.

FIG. 10C is a top plan view of the float of FIG. 10A.

FIG. 10D is a cross-sectional view taken along line D-D of FIG. 10A.

DETAILED DESCRIPTION

The present invention is directed to a landfill well pump for controlling liquid levels within the landfill.

In FIG. 1A and elsewhere herein, a vertical/longitudinal axis A-A is indicated by upward and downward directions ("upward", "up", "upper", "top", and "above", or "downward", "down", "lower", "bottom", and "below" are terms used herein interchangeably).

Figures 2A, 2B:
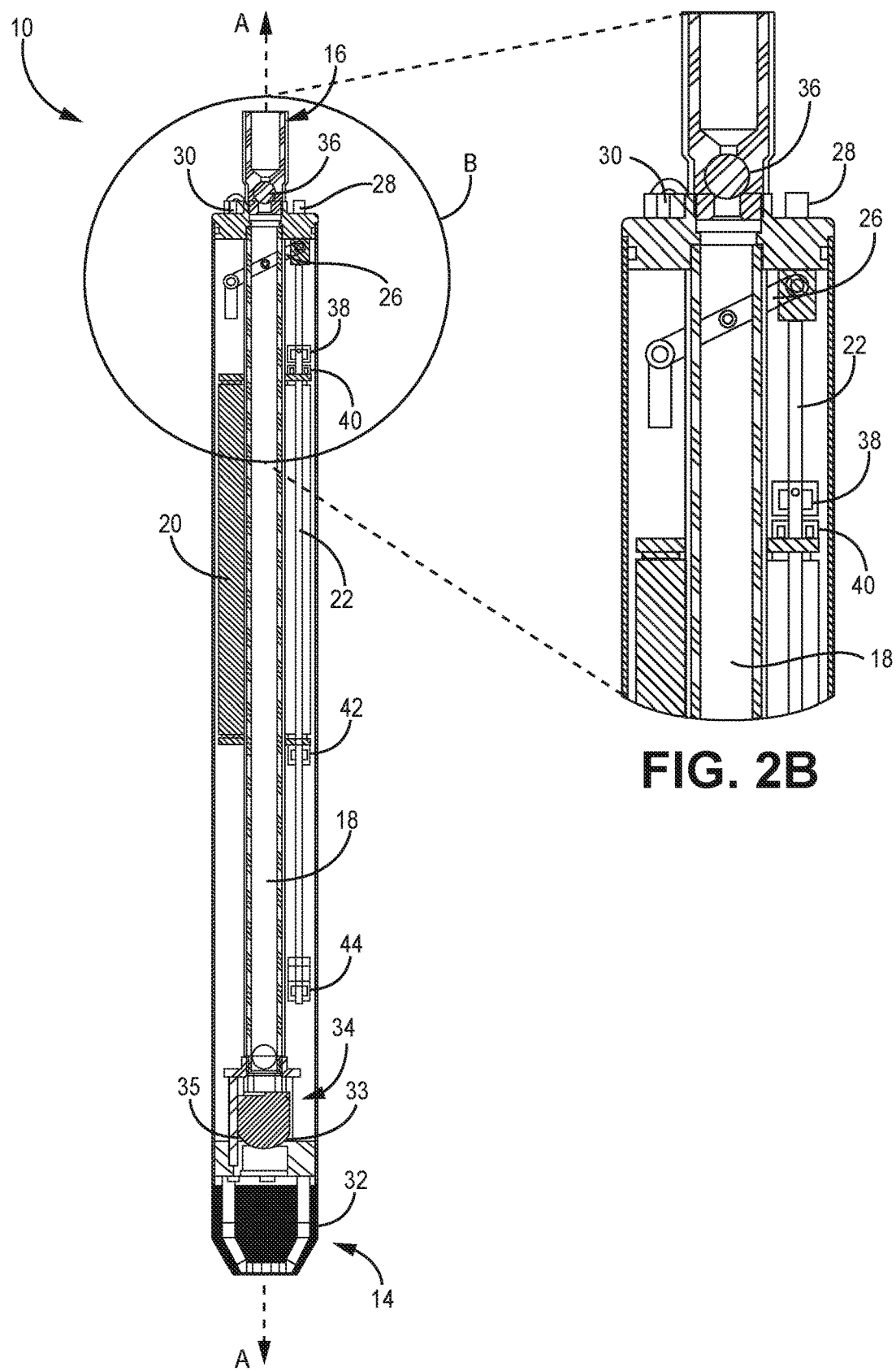
FIG. 2A is a cross-sectional view of an embodiment of the land fill well pump in a second state.
FIG. 2B is an enlarged view of detail B in FIG. 2A.

FIG. 1A is a cross-sectional view of land fill well pump 10 in a first state. FIGS. 1B and 1C are enlarged views of details B and C, respectively, of FIG. 1A. FIG. 2A is a cross-sectional view of land fill well pump 10 in a second state. FIG. 2B is an enlarged view of detail B of FIG. 2A. FIGS. 1A-2B will be discussed together.

As shown in FIGS. 1A-2C, pump 10 includes a tubular outer case 12 defining a pump interior and exterior, inlet 14 for taking in liquid at a lower end of pump 10, and outlet 16 for expelling liquid at an upper end of pump 10. Pump 10 further includes discharge tube 18, float 20, and control rod 22 all generally concentric within outer case 12. Dampening mechanism 24 helps regulate (e.g., dampen) the movement of control rod 22 and rocker 26 to permit pressurized airflow into pump 10 through pressurized air inlet 28 via actuation of pneumatic valve 30.

Inlet 14 includes inlet screen 32 for filtering out larger solids as liquids are taken in at inlet 14, and inlet check valve 34 through which liquid can move to an interior of pump 10 as defined by outer case 12. As shown, inlet check valve 34 includes semi-hemispherical valve closure 33 that engages annularly with seat 35, for example, by a force generated by pressurized air during evacuation of the landfill well pump. Alternative valve shapes, such as a sphere, are contemplated herein. Similarly, outlet 16 includes outlet check valve 36 which can be, for example, a ball and annular seat-type gravity check valve.

Discharge tube 18 is disposed within the interior of pump 10 and extends between inlet 14 and outlet 16. Discharge tube 18 includes discharge tube inlet 19 through which liquid can flow to be ultimately evacuated from outlet 16. Discharge tube 18 is elongate along axis A-A coaxially aligned with outer case 12. In operation, liquid within discharge tube 18 moves in the upward direction, from inlet 14 to outlet 16, as is described in greater detail below. Float 20 surrounds discharge tube 24. Float 20 can be formed from a foam or other buoyant material such that it is buoyant relative to liquid within pump 10. Float 20 can further be tubular with a main passage (labeled in FIG. 9C) through which discharge tube 18 can extend. To facilitate the up and down movement of float 20 along static discharge tube 18, gap G can exist between an outer surface of discharge tube 18 and the surface of the main passage within float 20.

Control rod 22 can be disposed through a side passage (labeled in FIG. 9B) in float 20. Float 20 can generally move upward and downward along axis A-A relative to control rod 22 within a limited range before, on its upward or downward relative movement, float 20 operationally engages control rod 22 to move control rod 22 upward or downward. Float 20 need not directly engage (be in direct contact with) control rod 22 in an exemplary embodiment. Rocker 26 can be in operational contact with control rod 22 such that movement of control rod 22 causes a corresponding movement in rocker 26. In an exemplary embodiment, control rod 22 can be mechanically attached to rocker 26, while in an alternative embodiment, control rod 22 may not be mechanically attached to rocker 26, but move relative to one another. Control rod 22 can further be mounted, fastened, or otherwise attached to for example, discharge tube 18 or outer case 12.

Rocker 26 is actuatable to move between two states. In a first state generally depicted in FIGS. 1A-1C, control rod 22 and rocker 26 are in a down position in which pneumatic valve 30 is closed. The closure of pneumatic valve 30 generally prevents pressurized air from flowing into the interior of outer case 12 via pressurized air inlet 28. In a second state generally depicted in FIGS. 2A and 2B, the liquid level within the interior of outer case 12 moves float 20 upward a sufficient degree to move control rod 22 upward and actuate rocker 26. The movement of rocker 26 opens pneumatic valve 30 to allow pressurized air into the interior of outer case 12. The influx of pressurized air forces airflow down around float 20 and to the liquid that is radially between discharge tube 18 and outer case 12. The force on the liquid closes inlet check valve 34, forcing liquid upward through discharge tube 18, outlet check valve 36, and ultimately through outlet 16. This evacuation of the liquid then causes float 20 to drop (i.e., move downward) which pivots rocker 26 back into the first state, closing pneumatic valve 30 and preventing further pressurized air from being discharged into the interior of outer case 12. Inlet check valve 34 then opens, allowing more liquid to enter the interior of outer case 12 from an exterior environment to again lift float 20, repeating the cycle.

As previously described, float 20 can move somewhat independently of control rod 22 but interacts with control rod 22 near its upper and/or lowermost range of movement to actuate rocker 26 to open or close pneumatic valve 30. Actuation of rocker 26 can refer generally to any of a pivoting, tipping, or rotating movement. Rocker 26 can be connected to discharge tube 18 to pivot on discharge tube 18. Dampening mechanism 24 can be used to further regulate the movement of float 20 and control rod 22 and a corresponding actuation of pneumatic valve 30. In the embodiment of FIGS. 1A-2B, dampening mechanism 24 can be a series of magnets positioned within outer case 12. Specifically, magnets 38 and 40 are positioned above float 20 (i.e., on the side of outlet 16), while magnets 42 and 44 are positioned below float 20 (i.e., on the side of inlet 14). More specifically, magnets 38 and 44 can be mounted/attached to control rod 22 proximate its opposite axial ends, while magnets 40 and 42 can be mounted/attached to float 20 on opposing axial surfaces (i.e., top and bottom), respectively. In a float embodiment including end caps (labeled, for example, in FIG. 9B), magnets 40 and 42 can be mounted to the end caps of float 20.

Figure 3A:
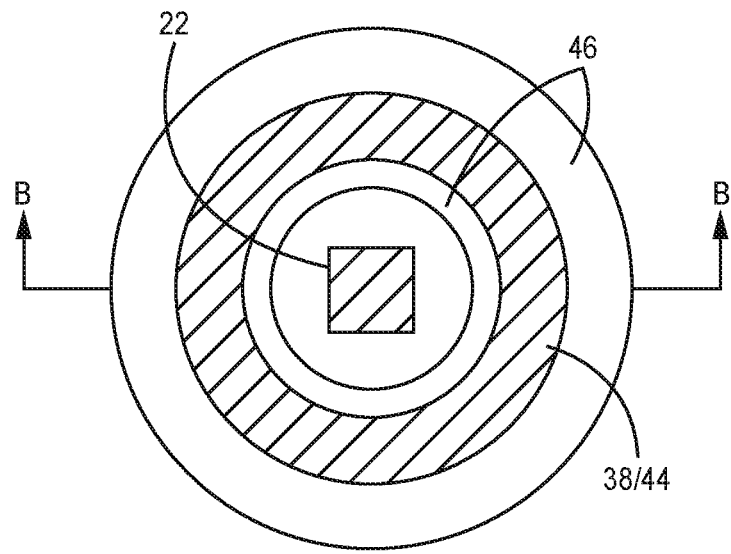
FIG. 3A is a cross-sectional view of a portion of a dampening mechanism of the land fill well pump.
Figure 3B:
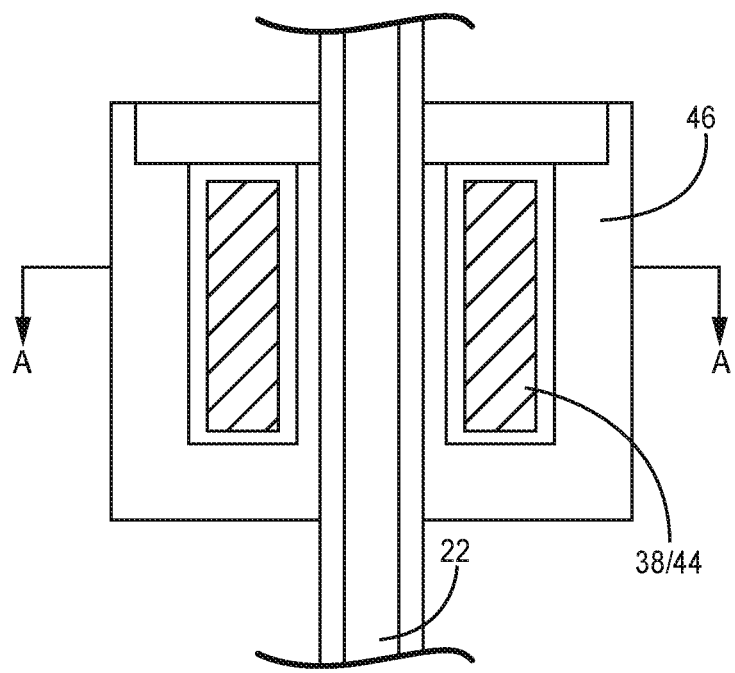
FIG. 3B is a cross-sectional view of the portion of a dampening mechanism of the land fill well pump taken perpendicularly to the view of FIG. 3A.
Figure 4A:
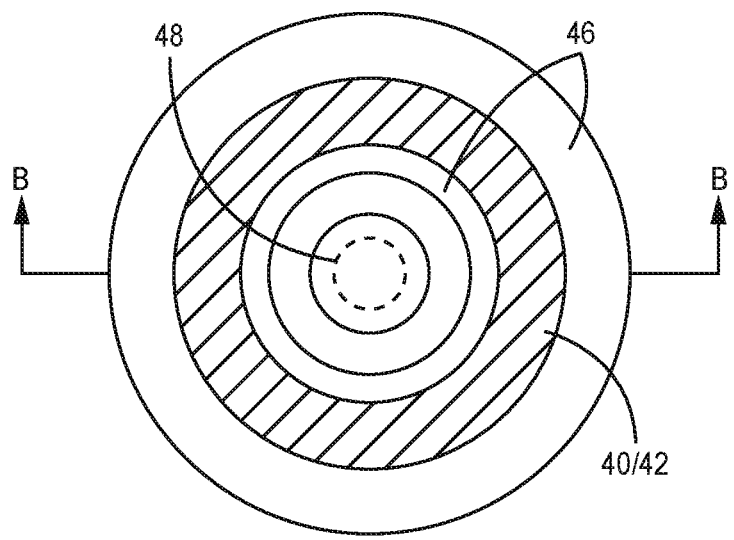
FIG. 4A is a cross-sectional view of a portion of a dampening mechanism of the land fill well pump.
Figure 4B:
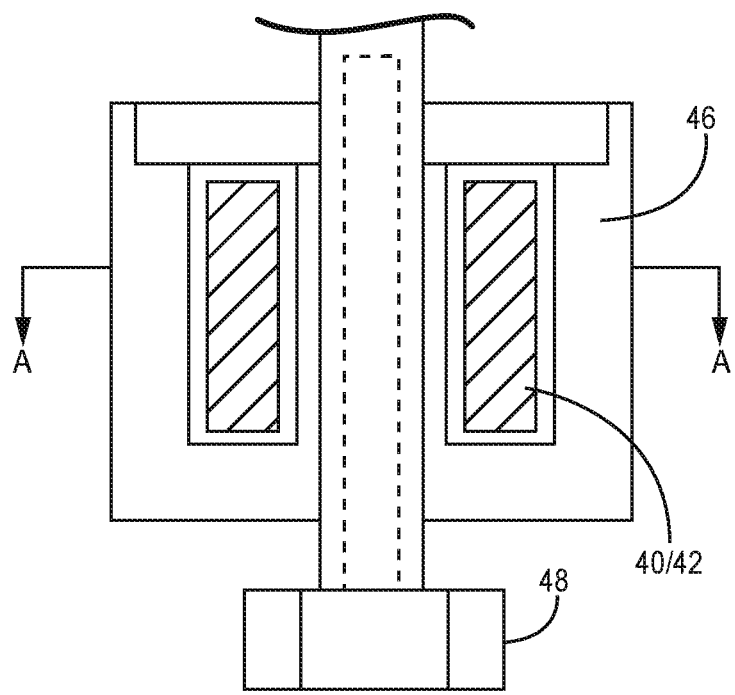
FIG. 4B is a cross-sectional view of the portion of a dampening mechanism of the land fill well pump taken perpendicularly to the view of FIG. 4A

FIGS. 3A and 3B are perpendicular cross-sectional views of a control rod mounted magnet (38 and/or 44). More specifically, FIG. 3A is a cross-sectional view taken along line A-A of FIG. 3B, and FIG. 3B is a cross-sectional view taken along line B-B of FIG. 3A. FIGS. 4A and 4B are perpendicular cross-sectional views of a float mounted magnet (40 and/or 42). More specifically, FIG. 4A is a cross-sectional view taken along line A-A of FIG. 4B, and FIG. 4B is a cross-sectional view taken along line B-B of FIG. 4A. The following description is best understood with simultaneous reference to FIGS. 1A-4B.

As shown in FIGS. 1A-2B, magnets 38 and 44 can be fixed to control rod 22, while magnets 40 and 42 can be fixed to float 20. Each of magnets 38-44 can be encased in housing 46 made from a polymer or other protective material to resist corrosion from the landfill liquid. Magnets 38-44 and housings 46 can be tubular to accommodate control rod 22 and/or fastener 48, which can be a screw or other suitable fastener. FIGS. 3A and 3B illustrate, for example, magnet 38 and/or 44, with control rod 22 extending therethrough. FIGS. 4A and 4B illustrate, for example, magnet 40 and/or 42 with fastener 48 extending therethrough for attaching it to float 20 (not shown in FIG. 4). Magnets 40 and 42 can alternatively be mounted to float 20 with an adhesive. Magnets 38 and 44 can be mounted to control rod 22 by, for example, a fastener and/or adhesive applied to housing 46, via interference fit.

Magnets 38 and 40 do not interact (or have a negligible interaction) beyond a threshold separation distance but can be configured with opposing poles such that there is a repulsive force between the two within the threshold separation distance. Magnets 42 and 44 can be substantially similarly configured with opposing poles. In operation, float 20 is lifted upward by liquid within outer case 12. Magnet 40, attached to float 20, correspondingly moves closer to magnet 38, and the magnetic field interaction between the two increases and an upward force is exerted on magnet 38. Magnet 38 may not initially be moved by the upward force, thus the arrangement of the magnets 38 and 40 can have a dampening effect as each is allowed to move relative to the other and apply force to a limited degree without tipping rocker 26. However, as float 20 is further pushed upward, moving magnet 40 closer to magnet 38, the repulsive/opposing force on magnet 38 increases until it eventually pushes magnet 38 and control rod 22 upward. The upward movement of control rod 22 pivots rocker 26 to open pneumatic valve 30. The opposing forces between magnets 38 and 40 further help regulate the upward movement of float 20 such that it moves in a controlled manner (e.g., not too quickly).

Similarly, in another part of the pump cycle, float 20 moves downward due to the evacuation of liquid from the interior of outer case 12. Magnet 42 is attached to float 20 and moves toward magnet 44, which is attached to control rod 22, as float 20 moves downward. As magnet 42 moves closer to magnet 44, the force on magnet 44 increases until it is sufficiently strong to move magnet 44 and control rod 22 downward. The downward movement of control rod 22 pivots rocker 26 to close pneumatic valve 30. The opposing forces between magnets 42 and 44 can further help regulate the downward movement of float 20 such that it moves in a controlled manner (e.g., not too quickly).

It should be understood that although two opposing magnet pairs (i.e., magnets 38 and 40, and magnets 42 and 44) are shown in the embodiment of FIGS. 1A-4B, dampening mechanism 24 can include only one pair of magnets or no magnets in an alternative embodiment. Dampening mechanism 24 can additionally and/or alternatively include magnets positioned elsewhere along the float-control rod assembly. For example, float 20 can partially overlap magnets 40 and 42 such that they are positioned closer to one another or are essentially level with one another. The magnets used in any embodiment with a magnetic dampening mechanism 24 can be appropriately sized, positioned, and/or formed from a magnetic material suitable for creating a desired magnetic interaction and controlled movement of control rod 22 and pneumatic valve 30. In an alternative embodiment, an individual magnet (e.g., magnet 38) can be formed as a single piece or as multiple magnetic portions formed into a desired shape (e.g., tubular). Further, a magnet need not fully surround control rod 22.

Figure 12:
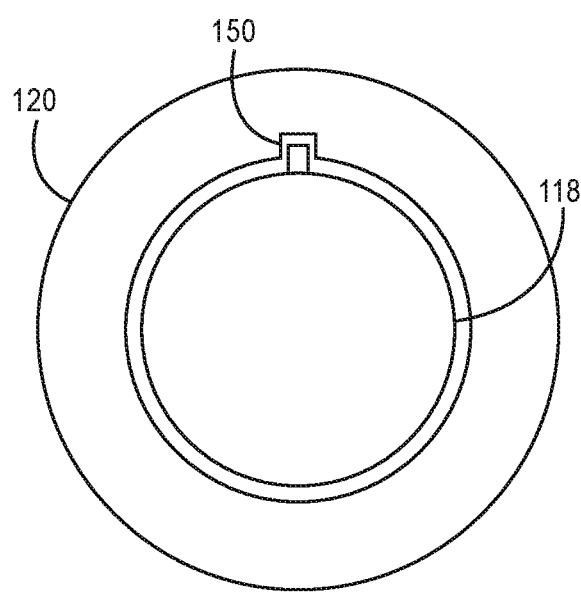
FIG. 12 is a cross sectional view of the landfill well pump float taken along line 12 of FIG. 5A.

FIG. 5A is a cross-sectional view of land fill well pump 110 in the first state. FIGS. 5B and 5C are enlarged views of details B and C, respectively, of FIG. 5A. FIG. 6A is a cross-sectional view of land fill well pump 110 in the second state. FIGS. 6B and 6C are enlarged views of details B and C, respectively, of FIG. 6A. FIG. 12 is a cross-sectional view taken along line 12 of FIG. 5A. FIGS. 5A-6C and 12 will be discussed together, and like parts are indicated by reference numerals increased by 100.

Pump 110 is substantially similar to pump 10 such that it includes tubular outer case 112, inlet 114, outlet 116, discharge tube 118, float 120, control rod 122, dampening mechanism 124 (as magnets 138, 140, 142, and 144), rocker 126, pressurized air inlet 128, and pneumatic valve 130. Pump 110 differs from pump 10 in that magnets 138, 140, 142, and 144 (hereinafter magnets 138-144) are separate from control rod 122. In some embodiments, control rod 122 could be angularly offset with respect to magnets 138-144 (e.g., out of plane with respect to the cross-sectional views of FIGS. 5A-6C and therefore not labeled). Similarly, outlet check valve 136 air inlet 128, and pneumatic valve 130 are out of plane in the particular views of FIGS. 5A-6C and are also not labeled. In other embodiments, control rod 122 may be omitted.

In such case that control rod 122 is not present, the shape of the main passage of float 120 may be keyed to the shape of the exterior of discharge tube 118 or outer case 112 to prevent rotation of the float and keep magnets 138-144 in alignment. FIG. 12 illustrates an embodiment in which keyed interface 150 is included to prevent rotation of float 120 relative to discharge tube 118. Keyed interface 150 can be configured as standard keyed joint, for example with any of a keyway or key seat formed on either of float 120 and discharge tube 118, with a key disposed between. In an alternative embodiment, the keyed interface can be located between float 120 and an inner surface of outer case 112. In yet another alternative embodiment, float 120 can be allowed to freely rotate with respect to discharge tube 118.

As shown, magnets 140 and 142 are attached to the top and bottom, respectively, of float 120. Magnet 144 is mounted on discharge tube 118 while magnet 138 hangs from rocker 126. Magnets 138-144 can operate in a substantially similar manner to their counterparts within pump 10. Specifically, liquid raising float 120 causes magnet 140 to push magnet 138 upward to pivot rocker 126. In this case, magnet 138 is attached or otherwise in operational contact with rocker 126. Rocker 126 can further include weights 127 on opposing sides (only one weight is labeled in FIGS. 5A-6C). Weights 127 can be used to balance rocker 126, although the side of rocker 126 that carries magnet 138 can be heavier relative to the other side so that instead of being pulled closed to the first state by control rod 122 when the interaction of magnets 138 and 140 diminishes as float 120 moves downward, the weight pivots rocker 126 to close pneumatic valve 130. When rocker 126 pivots to open pneumatic valve 130, pressurized air rushes in to the interior of outer case 112 causing fluid to evacuate out of discharge tube 118 which lowers float 120, moves magnet 140 out of interaction range of magnet 138 to allow the weight of rocker 126 to once again close pneumatic valve 130. In this embodiment, magnets 142 and 144 do not interact to close pneumatic valve 130 but can interact to slow the movement of float 120 if it is traveling downward too quickly. Like magnets 38-44, magnets 138-144 can be encased in a protective housing, formed as one or more sections, and can have a tubular or other desired shape.

FIG. 7A is a cross-sectional view of land fill well pump 210 in the first state. FIGS. 7B and 7C are enlarged views of details B and C, respectively, of FIG. 7A. FIG. 8A is a cross-sectional view of land fill well pump 210 in the second state. FIGS. 8B and 8C are enlarged views of details B and C, respectively, of FIG. 8A. FIGS. 7A-8C will be discussed together, and like parts are indicated by reference numerals increased by 100 with respect to the embodiment of FIGS. 5A-6C.

Pump 210 is substantially similar to pumps 10 and 110 except that instead of magnets, dampening mechanism 224 includes a series of compression parts 246 and 247, which in this embodiment, are spring-based parts. As with pump 110, control rod 222 of pump 210 can be out of plane in the views of FIGS. 7A-8C, or it can be omitted from pump 210. Compression parts 246 and 247 work in a manner generally similar to the magnets of dampening mechanisms 24 and 124 to regulate the movement of float 220 and the actuation of rocker 226.

As shown in FIGS. 7A-8C, compression part 246 is attached to the top side of float 220. More specially, compression part 246 includes tube 250 and spring 252 extending beyond an opening of tube 250 to engage with contact 254 which can be part of rocker 226. The upward movement of float 220 causes spring 252 of compression part 246 to engage contact 254 and compress and absorb energy. Spring 252 re-exerts force on contact 254 to pivot rocker 226 to open pneumatic valve 230. Compression part 247 is attached to the bottom side of float 220 and includes tube 256 and spring 258 extending beyond tube 256. Compression part 248 can engage with contact 260 shown attached to discharge tube 218 and works in a similar manner to compression part 246 to dampen the downward movement of float 120 during evacuation of liquid from within outer case 212 and discharge tube 218. In some embodiments, rocker 226 can be weighted in a manner similar to rocker 126 in order to cause it to pivot after the force of compression part 246 is removed. In a float embodiment including end caps (labeled, for example, in FIG. 9B), compression parts 246 and 247 can be mounted to the end caps of float 220.

FIG. 9A is an elevation view of float 320. FIG. 9B is a cross-sectional view taken along line B-B of FIG. 9A. FIG. 9C is a top plan view of float 320. FIGS. 9A-9C will be discussed together. Float 320 can represent any of float 20 (FIGS. 1A-2B), float 120 (FIGS. 5A-6C), or float 220 (FIGS. 7A-8C).

Float 320 includes a plurality of holes 362. Each hole 362 is open on the cylindrical exterior of float 320 and extends to main passage 364 that extends along the axis of float 320, which is aligned with vertical axis A-A. Main passage 364 is configured to receive/be disposed around, for example, discharge tube 18, which is not shown in FIGS. 9A-9C for simplicity. Holes 362 are aligned to intersect with side passage 366, which is elongate along vertical axis A-A. Side passage 366 can be configured to receive/be disposed around, for example, control rod 22, which is not shown in FIGS. 9A-9C for simplicity. In an alternative embodiment, side passage 366 can be omitted or otherwise disposed so as not to intersect holes 362. Float 320 also includes end caps 368 on its upper and lower ends. End caps 368 can be attached to float 320 with fasteners 370. In an alternative embodiment, end caps 368 may be attached with an adhesive or other suitable means. As shown in FIG. 9C, end caps 368 can include openings aligned with main passage 364 and side passage 366 (if included).

Holes 362 allow liquid surrounding float 320 to flow radially inward to contact the control rod and/or discharge tube to clean these parts to remove any accumulated debris which can otherwise cause binding of pump 10, 110, and/or 210. Holes 362 also allow the interior of main passage 364 to be sprayed with a nonstick coating during manufacture. While holes 362 are shown aligned in a row along axis A-A, holes 362 could be spread about float 320 so that they are not aligned in this matter.

FIG. 10A is an elevation view of float 420. FIG. 10B is a cross-sectional view taken along line B-B of FIG. 10A. FIG. 10C is a top plan view of float 320. FIG. 10D is a cross-sectional view taken along line D-D of FIG. 10A. FIGS. 10A-10D will be discussed together. Float 420 can represent any of float 20 (FIGS. 1A-2B), float 120 (FIGS. 5A-6C), or float 220 (FIGS. 7A-8C).

Float 420 is configured in sections, and as shown, is configured as first half 472 and second half 474. Because float 420 has a tubular geometry, first half 472 and second half 474 are each generally "C" shaped/semicircular/arcuate and extend along vertical axis A-A. Other sectioned configurations (e.g., thirds, fourths, etc.) are contemplated herein. First half 472 and second half 474 can be equal in size, weight, and/or angular distance about main passage 464. FIG. 10D shows seams 476 disposed at the interface between first half 472 and second half 474. The plane of seams 476 can intersect side passage 466, as is shown, but may not intersect side passage 466 in alternative embodiments. First half 472 and second half 474 can be attached to one another via end caps 468 on the upper and lower ends of float 420. More specifically, each half 472, 474 can be fastened to one or both end caps 468 via screws 470 or other suitable fastener. End caps 468 can include flanges 469 extending in the vertical direction to wrap around a portion of first half 472 and second half 474 to hold the halves together. First half 472 and second half 474 can additionally and/or alternatively be held together using an adhesive. The configuration of float 420 allows main passage 464 and side passage 466 to be coated with a nonstick coating prior to final assembly. Such a coating can extend the life of float 420.

Figures 11A, 11B:
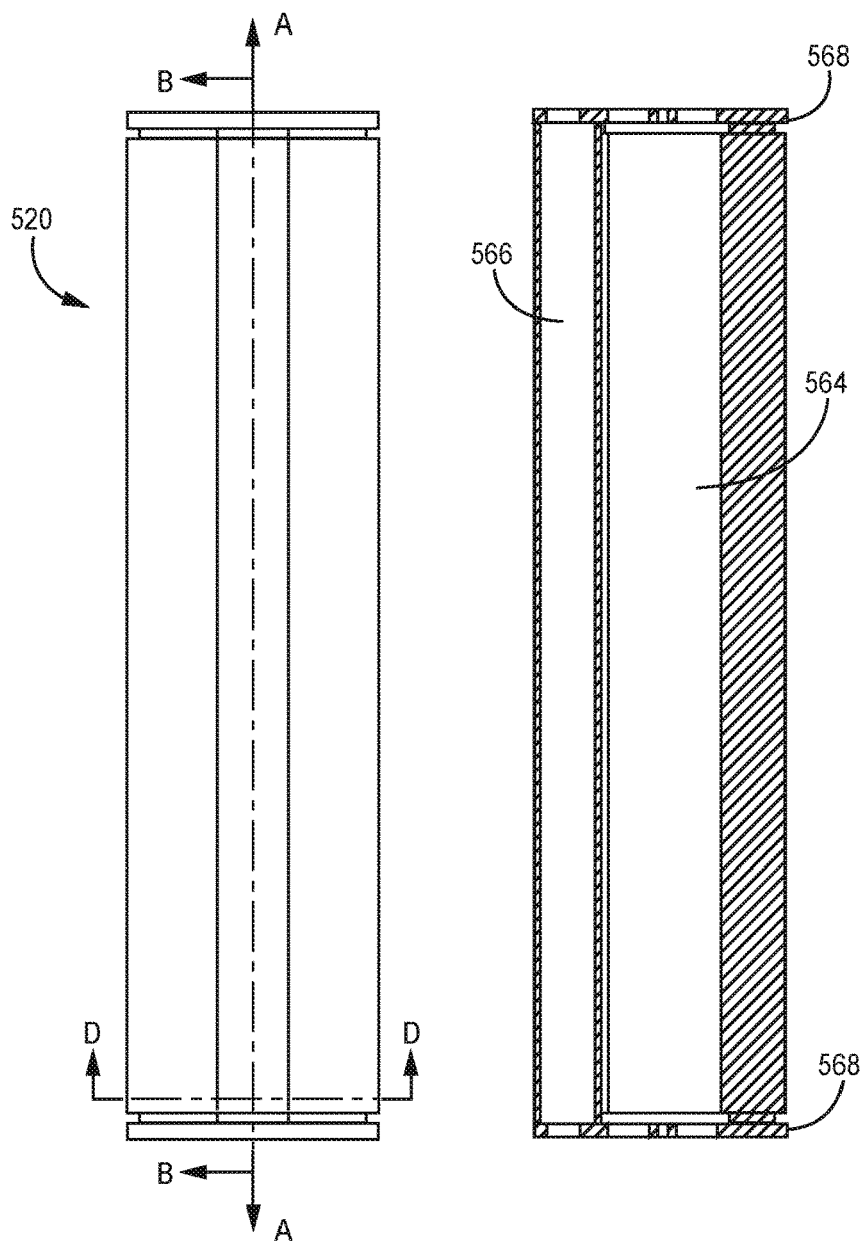
FIG. 11A is an elevation view of a second alternative embodiment of a landfill will pump float.
FIG. 11B is a cross-sectional view of the float taken along line B-B of FIG. 11A.
Figures 11C, 11D:
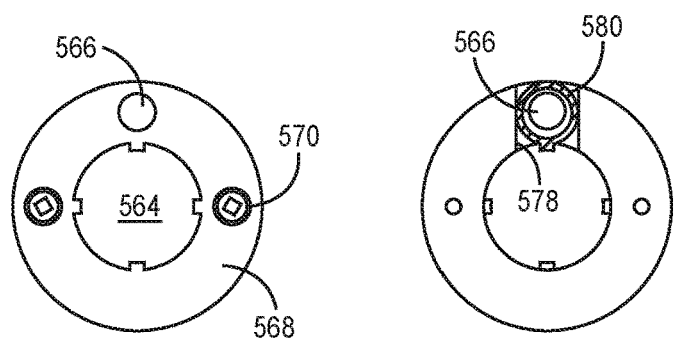
FIG. 11C is a top plan view of the float of FIG. 11A.
FIG. 11D is a cross-sectional view taken along line D-D of FIG. 11A.

FIG. 11A is an elevation view of float 520. FIG. 11B is a cross-sectional view taken along line B-B of FIG. 11A. FIG. 11C is a top plan view of float 520. FIG. 11D is a cross-sectional view taken along line D-D of FIG. 11A. FIGS.

11A-11D will be discussed together. Float 520 can represent any of float 20 (FIGS. 1A-2B), float 120 (FIGS. 5A-6C), or float 220 (FIGS. 7A-8C).

Float 520 includes slot 578, which at least partially defines side passage 566. Slot 578 can be a void created or cut from the foam material of float 520. Slot 578 can facilitate the application of a nonstick coating to the inner surface of main passage 564. During assembly, fill tube 580 can be inserted into slot 578 and control rod 522 (not shown) can be inserted through fill tube 580. As such, fill tube 580 extends along slot 578 for the length of most or all of float 520. Fill tube 578 can be attached to the foam material of float 520 such as with fasteners or adhesive, or it can be press fit. Fill tube 580 can additionally and/or alternatively be anchored by end caps 568 by being attached at its opposing ends to end caps 568 such as with fasteners (e.g., screw 570) or adhesive, or it can be press fit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A submersible fluid pump suitable for use in a landfill well, the fluid pump comprising:
   an outer case extending along a vertical axis and at least partially defining an interior of the fluid pump;
   a fluid inlet;
   a fluid outlet;
   a discharge tube within the outer case and disposed between the fluid inlet and the fluid outlet;
   a float positioned around the discharge tube and within the outer case such that the float is between the discharge tube and the outer case, the float being movable along the discharge tube in an axial direction;
   a pneumatic valve configured to introduce pressurized air into the interior of the fluid pump;
   an actuator configured to open and close the pneumatic valve; and
   a plurality of magnets comprising a first magnet fixed with respect to the actuator and a second magnet fixed with respect to the float, the second magnet configured to magnetically repel the first magnet as the float moves to tip the actuator to either open or close the pneumatic valve.

2. The fluid pump of claim 1, wherein the actuator is a rocker configured to pivot between a first state and a second state, the first state being associated with a closed state of the pneumatic valve, and the second state being associated with an open state of the pneumatic valve, and wherein the plurality of magnets form a dampening mechanism configured to pivot the actuator via a repulsive force between the first magnet and the second magnet.

3. The fluid pump of claim 2, wherein the first magnet and the second magnet cause the pneumatic valve to open with an upward movement of the float, and wherein the first magnet and the second magnet cause the pneumatic valve to close with a downward movement of the float.

4. The fluid pump of claim 3, wherein the plurality of magnets further comprises a third magnet and a fourth magnet, the third magnet being fixed with respect to the float.

5. The fluid pump of claim 4, wherein the repulsive force between the first magnet and the second magnet causes the pneumatic valve to open as the float moves axially upward, and wherein the repulsive force between the third magnet and the fourth magnet causes the pneumatic valve to close as the float move axially downward.

6. The fluid pump of claim 5, wherein at least one of the plurality of magnets is encased in a protective housing configured to prevent contact between the at least one magnet and fluid being pumped within the fluid pump.

7. The fluid pump of claim 3 and further comprising:
   a control rod spaced radially relative to the discharge tube within the interior of the fluid pump;
   wherein the first magnet is mounted on the control rod and the second magnet is mounted on the float; and
   wherein the repulsive force between the first magnet and the second magnet permits an opening and a closing of the pneumatic valve without direct contact between the control rod and the float.

8. The fluid pump of claim 3, wherein the pump does not include a control rod such that the first magnet is mounted to the actuator and the second magnet is mounted to the float.

9. The fluid pump of claim 8, wherein the float does not come into direct contact with the actuator.

10. The fluid pump of claim 8, wherein the float is keyed to one of the discharge tube and the outer case to prevent rotation of the float.

11. A submersible fluid pump suitable for use in a landfill well, the fluid pump comprising:
    an outer case extending along a vertical axis and at least partially defining an interior of the fluid pump;
    a fluid inlet;
    a fluid outlet;
    a discharge tube within the outer case and disposed between the fluid inlet and the fluid outlet;
    a float positioned around the discharge tube and within the outer case such that the float is between the discharge tube and the outer case, the float being movable along the discharge tube in an axial direction;
    a pneumatic valve configured to introduce pressurized air into the interior of the fluid pump; and
    an actuator configured to open and close the pneumatic valve;
    wherein the fluid pump does not include a control rod.

12. The fluid pump of claim 11, wherein the actuator is a rocker configured to pivot between a first state and a second state.

13. The fluid pump of claim 12, wherein opposing sides of the rocker are weighted with weights.

14. The fluid pump of claim 11 and further comprising:
    a dampening mechanism configured to regulate an axial movement of the float and to actuate the actuator.

15. The fluid pump of claim 14, wherein the dampening mechanism comprises a first magnet fixed with respect to the actuator and a second magnet fixed with respect to the float, the second magnet configured to magnetically repel the first magnet as the float moves to tip the actuator to either open or close the pneumatic valve.

16. The fluid pump of claim 11, wherein the float is keyed to one of the discharge tube and the outer case to prevent rotation of the float.

17. The fluid pump of claim 11, wherein the float comprises:

a main passageway extending in the axial direction and configured to accommodate the discharge tube;

at least two holes extending radially from an exterior of the float to the main passageway; and at least one endcap attached to an upper end or lower end of the float;

wherein the float has a tubular geometry and is formed from a foam material.

18. The fluid pump of claim 17, wherein the float comprises a plurality of sections joinable to form the tubular geometry.

19. The fluid pump of claim 18 wherein the float is configured as two arcuate sections with axial seams formed at an interface of the two arcuate sections.

20. A method of regulating axial movement of a float within a fluid pump, the fluid pump comprising an outer case extending along a vertical axis and a discharge tube coaxial with the outer case and disposed between a fluid inlet and a fluid outlet of the pump, the method comprising:

shifting the float in a first axial direction toward a rocker;

dampening a movement of the float in the first axial direction by a dampening mechanism on the float and such that the dampening mechanism moves upwards with the float;

actuating the rocker from a first state to a second state by movement of the float in the first axial direction, wherein the rocker opens a pneumatic valve when in the second state such that pressurized gas can enter the outer case to drive fluid out of the pump through the discharge tube; and shifting the float in a second axial direction away from the rocker as a fluid level within the pump decreases and such that the dampening mechanism moves away from the rocker.

\* \* \* \* \*